United States Patent [19]
Czarnik et al.

[11] Patent Number: 5,645,861
[45] Date of Patent: Jul. 8, 1997

[54] GUIDE ROLLER ASSEMBLY FOR A VACUUM SIZING TANK

[75] Inventors: David H. Czarnik, Twining, Mich.; Robert Henry Bessemer, York, Pa.

[73] Assignee: The Conair Group, Inc., Pittsburgh, Pa.

[21] Appl. No.: 512,149

[22] Filed: Aug. 7, 1995

[51] Int. Cl.⁶ .................... B29C 35/16; B29C 47/90
[52] U.S. Cl. ................... 425/71; 425/186; 425/392; 425/403.1; 264/209.4
[58] Field of Search ............... 425/71, 67, 68, 425/186, 188, 190, 392, 403.1, 388; 264/209.4

[56] References Cited

U.S. PATENT DOCUMENTS

| | | | |
|---|---|---|---|
| 4,044,084 | 8/1977 | Phipps | 425/71 |
| 4,247,271 | 1/1981 | Yonekara et al. | 425/71 |
| 5,008,051 | 4/1991 | DeCoursey et al. | 425/71 |
| 5,271,786 | 12/1993 | Gorney et al. | 425/71 |
| 5,340,295 | 8/1994 | Preiato et al. | 425/71 |
| 5,441,394 | 8/1995 | Keilert et al. | 425/71 |
| 5,464,335 | 11/1995 | Bessemer et al. | 425/71 |

FOREIGN PATENT DOCUMENTS 2-137910  5/1990  Japan .................... 264/209.4

*Primary Examiner*—Khanh P. Nguyen
*Attorney, Agent, or Firm*—Buchanan Ingersoll, P.C.

[57] ABSTRACT

A guide roller assembly is provided for use with a vacuum sizing apparatus having an elongated vacuum cooling tank containing a water bath through which plastic extrudate passes longitudinally. The guide roller assembly has a plurality of guide rollers each individually mounted on its own roller axle. A roller assembly pivot shaft is removably and pivotally secured within the elongated vacuum tank and supports the axles of the respective guide rollers. The guide rollers may be pivotally rotated between a working position where the axles are horizontal and the guide rollers bear down upon the extrudate passing through the vacuum cooling tank and a nonworking position where the guide rollers are raised above the water surface of the vacuum cooling tank and to one side of the tank. The entire guide roller assembly may be removed from the vacuum tank by retracting the telescoping pivot shaft and removing the ends of the pivot shaft from recesses formed in the end walls of the vacuum cooling tank.

15 Claims, 3 Drawing Sheets

GUIDE ROLLER ASSEMBLY FOR A VACUUM SIZING TANK

BACKGROUND OF THE INVENTION

1. Field of the Invention

This invention relates to a guide roller assembly for use in a vacuum sizing tank that cools molten plastic extrudate as it leaves the extruder in order to hold the size and shape of the extrudate as the molten plastic cools and hardens. The vacuum sizing tank contains water through which the extrudate passes as it cools. The guide roller assembly guides the extrudate and maintains it in a straight line below the surface of the water within the vacuum sizing tank. The guide roller assembly permits movement of the guide rollers from a working position where the guide rollers guide and hold down the extrudate to a nonworking position where the guide rollers do not interfere with the initial stringing of the extrudate through the vacuum sizing tank.

2. Description of the Prior Art

Efforts have been made in the plastics industry to provide for the controlled cooling and accurate sizing of molten plastic extrudate after it leaves the plastic extruder. The extrudate can easily be deformed if excessive pressure is applied to the outer surface of the extrudate. To prevent this type of deformation, vacuuming cooling and sizing tanks have been developed that have a water bath within a vacuum chamber which prevents excessive pressure from being applied to the surface of the extrudate as it cools. An example of such an arrangement is found in U.S. Pat. No. 5,340,295 entitled "Vacuum Sizing Apparatus With Controlled Vacuum".

When very small diameter tubing or other small extrudate is cooled in a vacuum chamber, it is essential to keep the extrudate under water even though the extrudate may have a tendency to float to the surface of the water, and it is further essential to keep the extrudate in a relative straight line as it moves from one end of the cooling tank to the other. An example of such a vacuum tank for small diameter extrudate may be found in U.S. patent application Ser. No. 08/298,325 filed Aug. 30, 1994 and entitled "Vacuum Tank For Vacuum Sizing Apparatus".

In earlier vacuum sizing tanks, guide rollers have been positioned sporadically through the tank to hold down the extrudate and guide it through the vacuum sizing tank. It has been difficult to thread the extrudate under the rollers in present vacuum sizing tanks and it has been difficult to align the rollers to precisely guide the extrudate in straight line through the tank.

SUMMARY OF THE INVENTION

In accordance with the present invention there is provided an improved guide roller assembly to guide extrudate through the water bath in the vacuum cooling tank of a vacuum sizing apparatus. The improved guide roller assembly includes a plurality of guide rollers that are each individually mounted on its own roller axle. The roller axles are secured at one end to a roller assembly pivot shaft and the roller assembly pivot shaft is mounted within the vacuum cooling tank parallel to the longitudinal walls of the vacuum cooling tank. The roller assembly pivot shaft is pivotable between a working position where the guide rollers are positioned to guide the extrudate and a nonworking position where the guide rollers are rotated with the pivot shaft out of contact with the extrudate.

Further in accordance with the present invention, there is provided an improved guide roller assembly for use in a vacuum sizing apparatus having an elongated vacuum cooling tank containing a water bath through which plastic extrudate passes longitudinally. The improved guide roller assembly includes a plurality of guide rollers each individually mounted on its own axle. A roller assembly pivot shaft having two telescoping sections that are spring biased to expand the shaft longitudinally so that the roller assembly pivot shaft may be readily inserted into and removed from the cooling tank is provided. The guide roller axles are secured at one end to the roller assembly pivot shaft and extend perpendicularly from it. The roller assembly pivot shaft is removably and pivotally positioned within the vacuum cooling tank parallel to the longitudinal walls of the vacuum cooling tank so that the roller assembly pivot shaft may be pivoted relative to the vacuum cooling tank between a working position where the guide rollers are positioned to guide the extrudate and a nonworking position where the guide rollers are rotated with the pivot shaft out of contact with the extrudate. The roller assembly pivot shaft has a collar fixed to it at one end and the collar has a plurality of recesses formed in it. A spring loaded detent is fixed to a wall of the vacuum cooling tank so that the detent is forced against the collar and enters one of the plurality of recesses when the roller assembly pivot shaft is positioned so that the guide rollers are in the working position and the detent enters another one of the recesses when the guide rollers are in the nonworking position.

Accordingly, a principal object of the present invention is to provide an improved guide roller assembly for a vacuum sizing tank that aids in the precision cooling and sizing of plastic extrudate.

Another object of the present invention is to provide a guide roller assembly for a vacuum sizing tank that may readily be moved into a working position in contact with the extrudate passing through the tank and may also readily be moved to a nonworking position to free the interior of the tank from rollers while the extrudate is being threaded through the tank.

These and other objects of the present invention will be more completely disclosed and described in the following specification, the accompanying drawings and the appended claims.

DESCRIPTION OF THE PREFERRED EMBODIMENT

Figure 1:
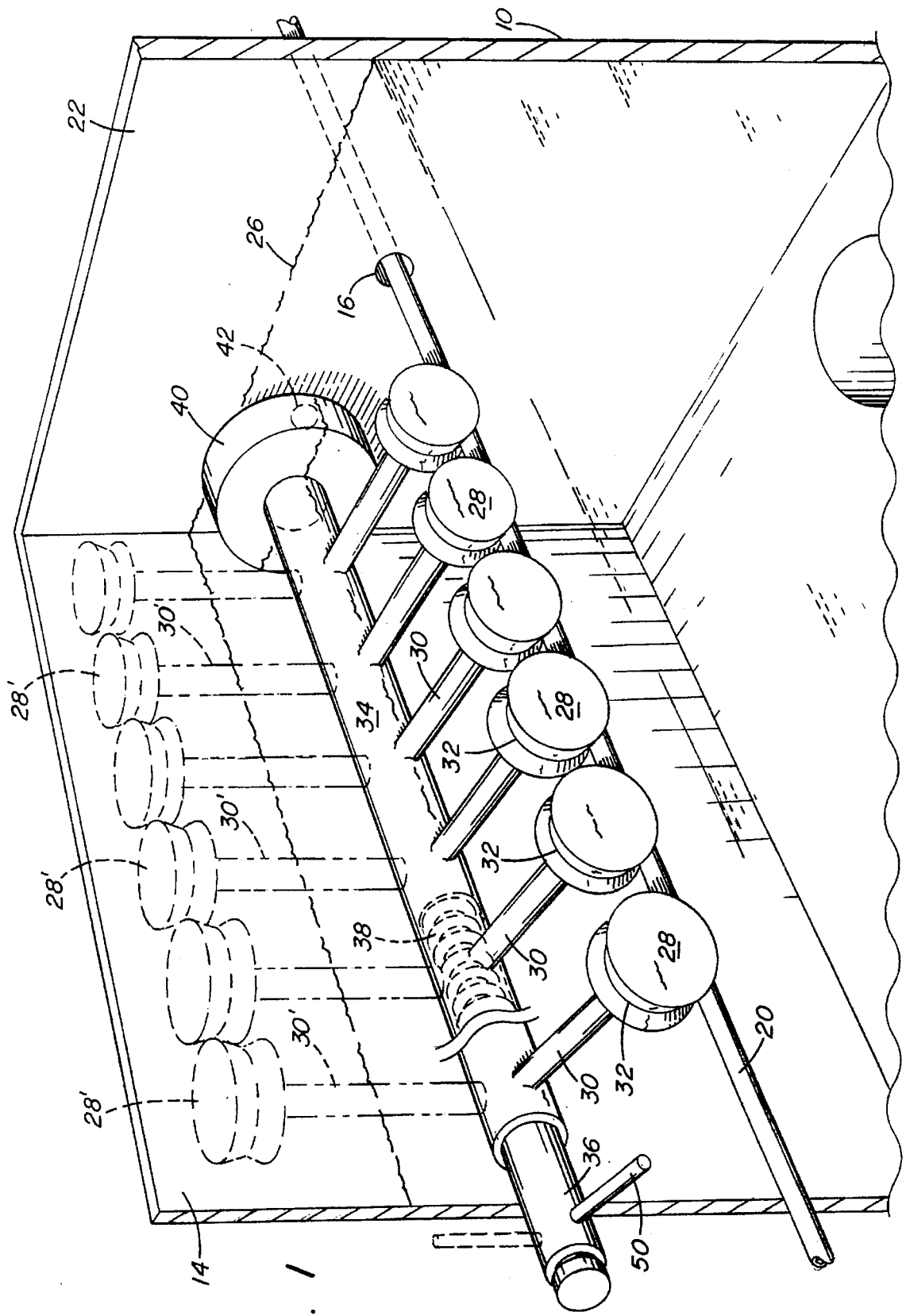
FIG. 1 is a perspective view, with portions of the tank cut away, of a vacuum sizing apparatus utilizing the improved guide roller assembly of the present invention.
Figure 2:
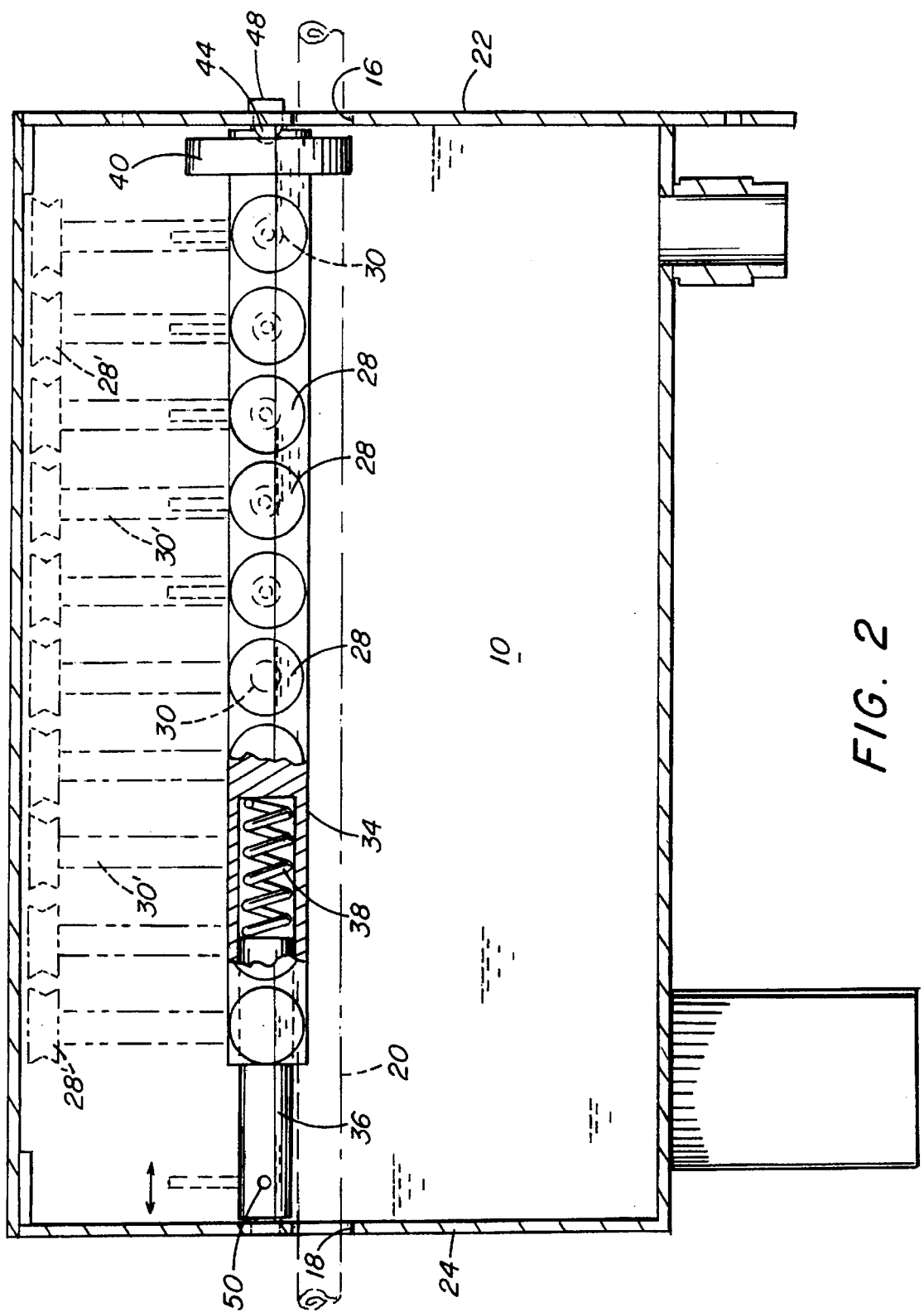
FIG. 2 is a side elevational section of the vacuum tank and guide roller assembly of FIG. 1.

Referring to the drawings, there is shown a vacuum cooling tank 10. The vacuum cooling tank 10 is preferably of the type shown in U.S. patent application Ser. No. 08/298,315 filed Aug. 30, 1994 and entitled "Vacuum Tank For Vacuum Sizing Apparatus". The vacuum cooling tank 10 has parallel side walls 12 and 14 with an extrudate entry port 16 and an extrudate exit port 18 in tank end wall 22 and tank end wall 24, respectively.

Extrudate 20 enters the vacuum cooling tank 10 through entry port 16, passes beneath the water level 26 within the tank 10 longitudinally through the tank 10 and exits the tank through exit port 18.

A series of guide rollers 28 preferably formed of low-friction plastic material are positioned with each guide roller 28 mounted on an axle 30. Guide rollers 28 may either be mounted for rotation relative to axles 30 or they may be fixed to axles 30 so that the extrudate merely slides past the guide rollers 28. Grooves 32 are formed within the roller face of the guide rollers 28. In some instances, it may be preferable not to have grooves in the roller face, but rather to have cylindrical guide rollers.

The roller axles 30 are secured at one end to a roller assembly pivot shaft 34 so that the axles 30 extend radially from roller assembly pivot shaft 34 and so that the axes of the axles 30 are all in a common plane. The guide rollers 28 are all aligned so that they are in a plane perpendicular to the plane of axles 30. The roller assembly pivot shaft has an auxiliary end portion 36 that telescopes into the end of roller assembly pivot shaft 34. A spring 38 biases the auxiliary end portion 36 longitudinally away from the main roller assembly pivot shaft 34. The ends of the roller assembly pivot shaft 34 and the auxiliary end portion 36, respectively, are pivotally received within recesses formed in end walls 22 and 24, respectively. The spring loaded auxiliary end portion 36 may be retracted to insert the roller assembly pivot shaft 38 into the recesses in the end walls 22 and 24, respectively and may also be retracted to remove the entire guide roller assembly from the vacuum cooling tank 10.

Figure 3:
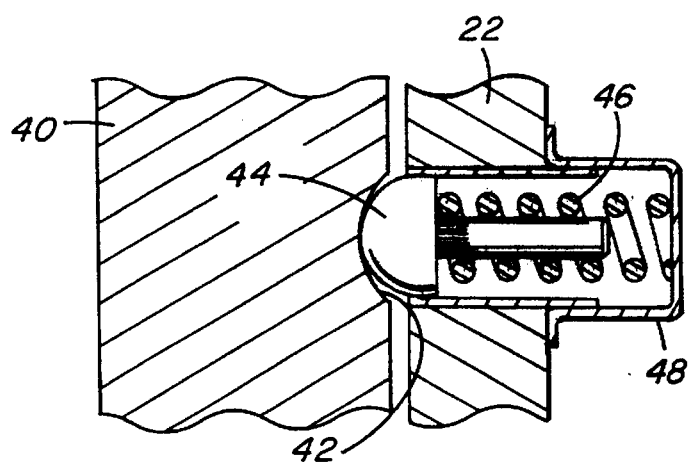
FIG. 3 is an enlarged detail drawing of a portion of the roller assembly pivot shaft and collar shown in FIG. 2.

A collar 40 is fixed to roller assembly pivot shaft 34 adjacent to end wall 22 of tank 10. The collar 40 has hemispherical recesses 42 formed in the face of collar 40 that is in proximity to end wall 22. As best seen in FIG. 3, a detent 44 having a hemispherical head is spring loaded by detent spring 46 acting between the hemispherical head of detent 44 and the cap 48 fixed to end wall 22 so that the detent 44 is biased toward collar 40. A handle 50 on auxiliary end portion 36 is utilized to retract the auxiliary end portion 36 of pivot shaft 34 to remove pivot shaft 34 from the tank 10.

As depicted in solid lines in the drawings, the guide roller assembly is in the working position when the roller assembly pivot shaft 34 is pivoted so that the roller axles 30 are horizontal and the guide rollers 28 are aligned above the extrudate 20 passing through the vacuum cooling tank 10. In that position, the detent 44 is positioned within one of the hemispherical recesses 42 in collar 40 to maintain the shaft position.

Figure 4:
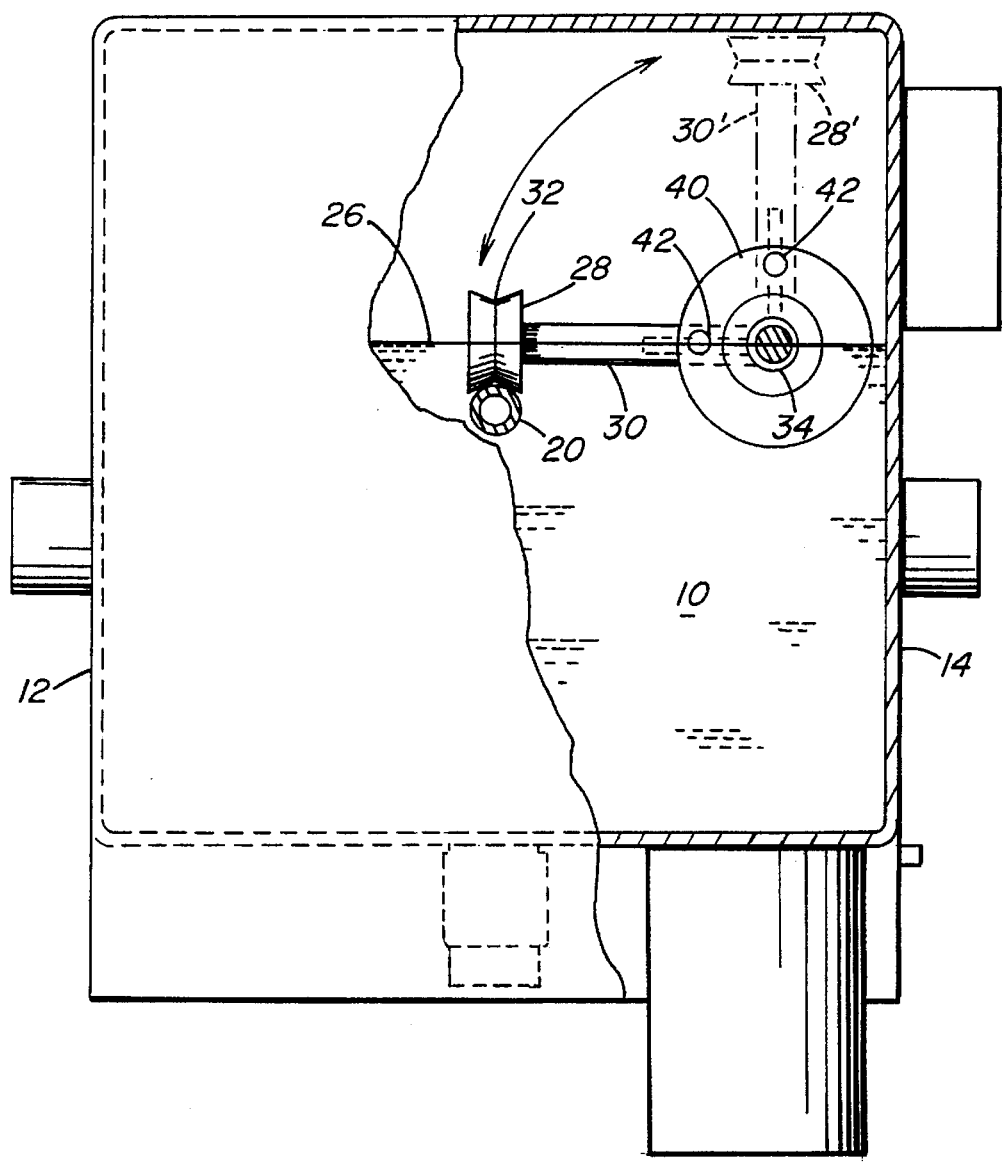
FIG. 4 is an end elevation, partially in section, of the vacuum cooling tank of FIGS. 1 and 2 showing the improved guide roller assembly.

The guide roller assembly may be moved to the nonworking position by rotating roller assembly pivot shaft 34 in a clockwise direction as viewed in FIG. 4 so that the axles and guide rollers assume the phantom line positions 30' and 28', respectively. When so rotated, the guide roller assembly provides open space at the center of the tank so that the extrudate can initially be threaded through the tank and out the exit port 18. After the extrudate is threaded in a line between the entry port 16 and exit port 18 of the vacuum cooling tank 10, the guide roller assembly may be rotated by rotating roller assembly pivot shaft 34 in a counterclockwise direction as viewed in FIG. 4 to bring the guide rollers into contact with the extrudate and thereby maintain the extrudate submerged and in a straight line position.

The guide roller assembly of the present invention may be completely removed from the vacuum cooling tank 10 by retracting the auxiliary end portion 36 of roller assembly pivot shaft 34 against spring 38 so that the interior of the vacuum cooling tank 10 may be easily cleaned and maintenance may be performed on the tank 10 and the roller assembly.

The roller assembly of the present invention is particularly useful for guiding very fine plastic extrudate such as thin walled, small diameter tubing used in medical applications as well as other small cross-sectional shapes of extrudate. The present invention permits ready threading of the extrudate through the vacuum cooling tank, permits easy cleaning of the interior of the vacuum cooling tank during maintenance, and permits ready positioning of the guide rollers to guide the extrudate after the extrudate has been threaded through entry port 16 and exit port 18 of the vacuum cooling tank 10.

According to the provisions of the patent statutes, we have explained the principle, preferred construction and mode of operation of our invention and illustrated and describe what we now consider to represent its best embodiment. However, it should be understood that, within the scope of the appended claims, the invention may be practiced otherwise than as specifically illustrated and described.

We claim:

1. In a vacuum sizing apparatus for plastic extrudate having an elongated vacuum cooling tank containing a water bath through which said extrudate passes longitudinally, an (improved) guide roller assembly to guide said extrudate through said bath, said improved guide roller assembly comprising:

a plurality of guide rollers each individually mounted on its own roller axle;

said roller axles being secured at one end to a roller assembly pivot shaft, said roller assembly pivot shaft being pivotally mounted within said vacuum cooling tank parallel to the longitudinal walls of said vacuum cooling tank and pivotable between a working position wherein said guide rollers are positioned to guide said extrudate and a non-working position wherein said guide rollers are rotated with said pivot shaft out of contact with said extrudate.

2. The improved guide roller assembly of claim 1 wherein said guide rollers are formed of plastic.

3. The improved guide roller assembly of claim 1 wherein said guide rollers are rotatably mounted relative to said axle.

4. The improved guide roller assembly of claim 1 wherein said guide rollers are fixed relative to said axles.

5. The improved guide roller assembly of claim 1 wherein said roller assembly pivot shaft is formed of two telescoping sections spring biased to expand said shaft longitudinally whereby said roller assembly pivot shaft may be readily inserted into and removed from said vacuum cooling tank.

6. The improved guide roller assembly of claim 1 wherein said guide rollers are positioned above and in line with said extrudate when said roller assembly pivot shaft is rotated to the working position.

7. The improved guide roller assembly of claim 1 wherein said guide rollers are each grooved on their circumferential surfaces to guide said extrudate.

8. An improved guide roller assembly for use in a vacuum sizing apparatus having an elongated vacuum cooling tank containing a water bath through which plastic extrudate passes longitudinally, said improved guide roller assembly comprising:

a plurality of guide rollers each individually mounted on its own roller axle;

a roller assembly pivot shaft comprising two telescoping sections spring biased to expand said shaft longitudinally whereby said roller assembly pivot shaft may be readily inserted into and removed from said vacuum cooling tank;

said guide roller axles being secured at one end to said roller assembly pivot shaft and extending perpendicularly therefrom;

said roller assembly pivot shaft being removably and pivotally positioned within said vacuum cooling tank parallel to the longitudinal walls of said vacuum cooling tank so that said roller assembly pivot shaft may be pivoted relative to said vacuum cooling tank between a working position wherein said guide rollers are positioned to guide said extrudate and a non-working position wherein said guide rollers are rotated with said pivot shaft out of contact with said extrudate;

said roller assembly pivot shaft having a collar fixed to it at one end thereof, said collar having a plurality of recesses formed therein;

a spring loaded detent fixed to a wall of said vacuum cooling tank whereby said detent is forced against said collar and enters one of said plurality of recesses when said roller assembly pivot shaft is positioned so that said guide rollers are in said working position and enters another one of said recesses when said guide rollers are in said non-working position.

9. The improved guide roller assembly of claim 8 wherein said guide rollers are rotatably mounted relative to said axles.

10. The improved guide roller assembly of claim 8 wherein said guide rollers are fixed relative to said axles.

11. The improved guide roller assembly of claim 8 wherein said guide rollers are positioned above and in line with said extrudate when said roller assembly pivot shaft is rotated to the working position.

12. The improved guide roller assembly of claim 8 wherein said guide rollers are each grooved on their circumferential surfaces to guide said extrudate.

13. The improved guide roller assembly of claim 8 wherein said guide rollers are formed of plastic.

14. The improved guide roller assembly of claim 8 wherein said roller axles are all disposed in the same plane.

15. The improved guide roller assembly of claim 8 wherein all of said guide rollers are longitudinally aligned.

* * * * *